Dec. 1, 1959 N. FREEDMAN 2,915,626

AUTOMATIC FREQUENCY CONTROL RESPONSIVE TO CARRIER FREQUENCY OF DISTINCTIVE PULSE AND PREVENTING DRIFT DURING SIGNAL FAILURE

Filed April 8, 1954 2 Sheets-Sheet 1

INVENTOR
NATHAN FREEDMAN
BY [signature]
ATTORNEY

Dec. 1, 1959 N. FREEDMAN 2,915,626

AUTOMATIC FREQUENCY CONTROL RESPONSIVE TO CARRIER FREQUENCY OF DISTINCTIVE PULSE AND PREVENTING DRIFT DURING SIGNAL FAILURE

Filed April 8, 1954 2 Sheets-Sheet 2

INVENTOR
NATHAN FREEDMAN
BY Elmer J. Gorn
ATTORNEY

United States Patent Office 2,915,626

Patented Dec. 1, 1959

2,915,626

AUTOMATIC FREQUENCY CONTROL RESPONSIVE TO CARRIER FREQUENCY OF DISTINCTIVE PULSE AND PREVENTING DRIFT DURING SIGNAL FAILURE

Nathan Freedman, Auburndale, Mass., assignor to Raytheon Company, a corporation of Delaware Application April 8, 1954, Serial No. 421,733

2 Claims. (Cl. 250—20)

This invention relates to reception of radiant energy, and particularly, to microwave systems employing a local oscillator to control the frequency modulation by which there is obtained a narrower band intermediate frequency serving as the signal carrier.

The invention is herein illustrated as applied to the reception of television signals radiated from an FM transmitter in which the video signal is treated in a manner serving to hold the sync tip frequency constant; the treatment (referred to as "D.C. restoration") being such as to reduce the amount of bandwidth occupied by the transmitted signal, and hence the amount of bandwidth necessary in the receiver. When so applied, the invention operates to effect corresponding "D.C. restoration" in the receiver half of the system; that is, to hold the I.-F. frequency corresponding to the video sync tip constant. This is achieved by means functioning to stabilize the local oscillator frequency, said means including a threshold circuit operating to clip the video sync pulses as they are received from conventional FM receiver circuitry including conventional I.-F. amplifiying, limiting and discriminator circuitry, and then to pass the clipped pulses through tuned amplifying and detection means to a summation network where the pulse carrying voltage is superimposed upon a D.C. voltage derived from a "before limiting" point in the receiver circuitry, to buck out the latter and thereby produce a zero net voltage so long as the incoming frequency conforms to the tuned value. The resulting klystron repeller voltage will bear a definite relationship to the incoming frequency, and will thus accomplish automatic frequency control.

Figure 1:
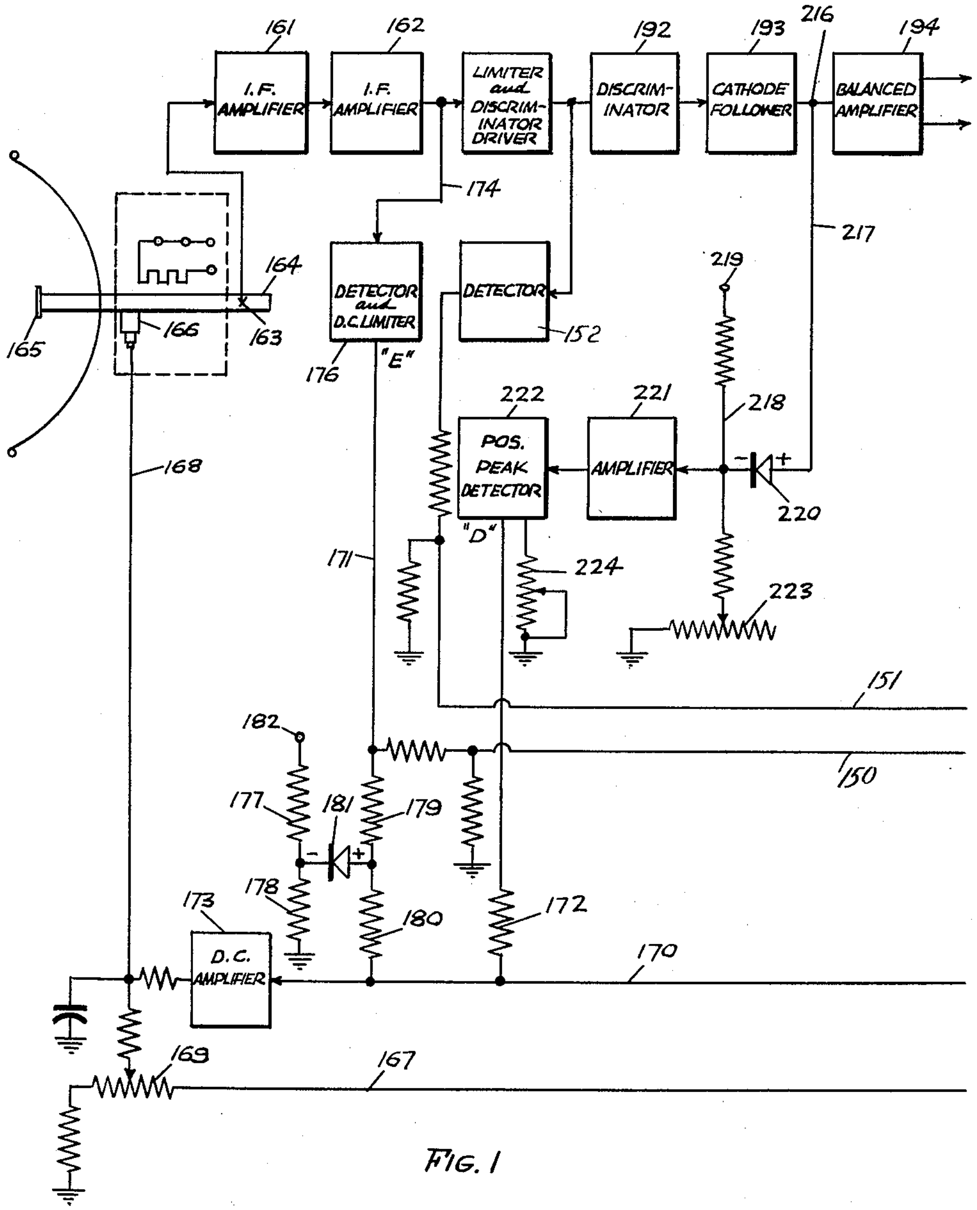
Figure 2:
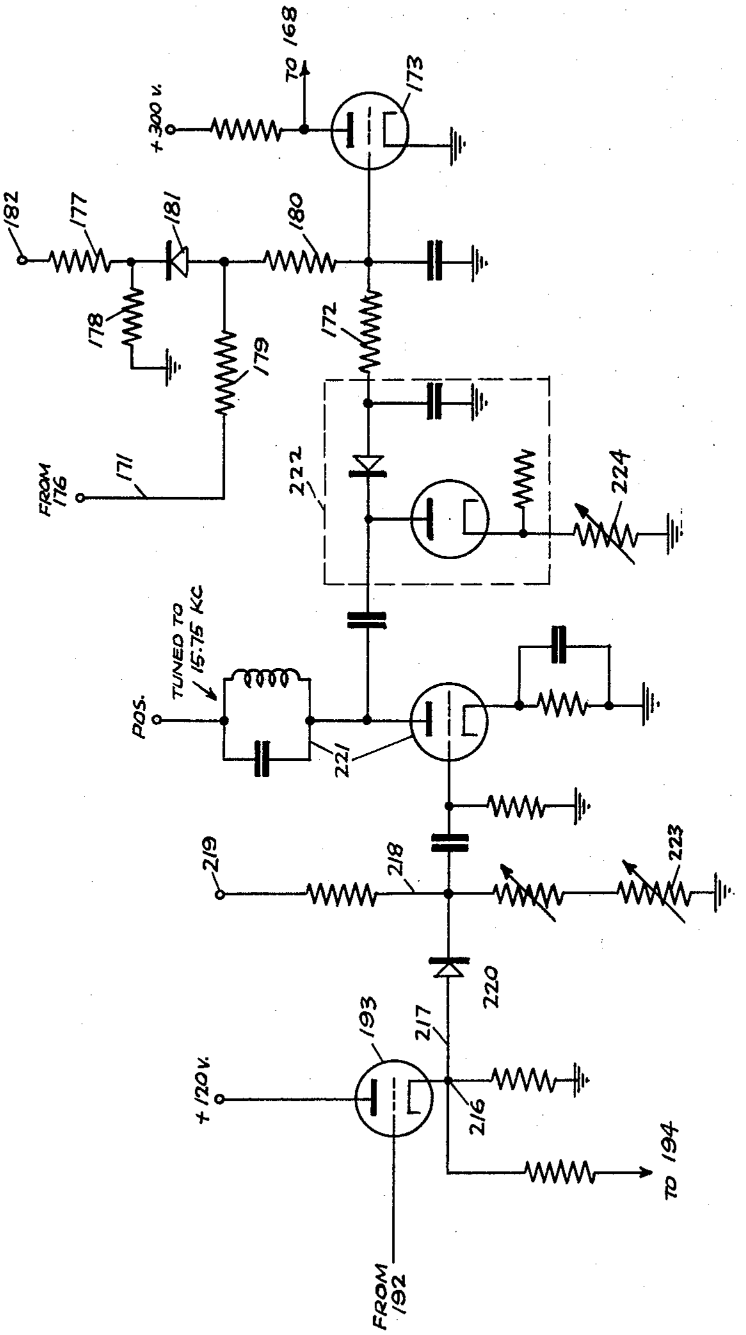

Other and further characteristics and advantages of this invention will be apparent as the description thereof progresses, reference being had to the accompanying drawings wherein:

Fig. 1 is a schematic diagram of FM receiver circuitry embodying the invention; and Fig. 2 shows the electrical connections for those components of Fig. 1 which are of primary importance in the production of the described results.

As indicated in Fig. 1, the electronic components of the receiving half of a television relay link system may include I.-F. amplifier units 161 and 162, adapted to receive the intermediate frequency output of the crystal mixer 163, located near the inner end of receiver wave guide 164 and serving to derive from the high frequency carrier wave input received by antenna 165, the predetermined narrow band frequency constituting the derived heterodyne frequency resulting from the frequency modulating action of the crystal mixer 163 working in conjunction with the local oscillator 166 (klystron or its equivalent), which also forms a part of the wave guide control assembly. The klystron 166 is, in turn, controlled by its repeller circuit voltage supplied thereto by conductors 167 connected to a supply source not illustrated and 168, including the adjustable potentiometer 169, the manual control circuit 170 which is a voltage takeoff point thereby making the correction voltage available for manual circuitry not illustrated, and the automatic frequency control circuits 171 and 172 connecting into the circuit 168 by way of D.C. amplifier unit 173. The AFC circuit 171 receives signals from the I.-F. amplifier 162 by way of conductor 174, which signals are subjected to peak negative detection and D.C. limiting in the unit 176, with the output thereof being supplied to the summation network 177–182 by way of the previously described conductor 171. The summation network includes resistor units 177 to 180, inclusive, a diode 181 and a source 182 for application of a positive reference voltage.

At a point 216, located between the two amplifying stages 193 and 194 in the output circuit of discriminator 192, a conductor 217 leads to a group of units constituting another part of the automatic frequency control circuits. This group of units supplements the regulating action of the units 177 to 182, inclusive, heretofore described. As indicated, these supplementary regulating units include a line 218 leading from positive source 219 to the negative side of a biased diode 220 whose positive terminal receives the video discriminator output by way of conductor 217, and clips the tops from the video sync pulses. From the negative terminal of the rectifier, the clipped video sync pulses are delivered to an amplifier 221 whose output is, in turn, supplied to a detection and voltage doubling unit 222 wherein the amplifier output is converted to a direct current derivative proportional in voltage to the amplitude of the clipped video pulses applied to the input of amplifier 221; the magnitude of said voltage derivative being initially adjusted in two stages by proper setting of the potentiometers 223 and 224.

For the sake of explanation, it may be assumed that the sync tips on the video signal are at the high-frequency end of the transmitted frequency band, that klystron 166 is low in frequency with respect to the transmitted signal, and that the discriminator slope (with respect to frequency) is positive. Any combination of the above possibilities may be handled by choosing the discriminator slope so as to lead to a stable closed loop (or by choosing polarity of the D. C. amplifier gain correctly).

Operation of the circuit may be explained by first examining its functions when operating normally; i.e., the receiver correctly locked on to an incoming signal. The discriminator herein assumed gives positive output only, but any other "D.C. axis" for the discriminator will serve just as well if the threshold voltage is chosen appropriately.

The biased diode 220 is arranged to act as a clipper or threshold circuit which takes the tops from the sync pulses, and passes them on for further amplification. The following amplifier 221 is tuned to the repetition rate of the sync pulses (about 15 kc.), both for noise suppression purposes, and to make use of the increased gain possible in a tuned amplifier. The output voltage is peak-rectified in detector 222; the result, at point "D," is a positive D.C. voltage whose amplitude (at least over a considerable range) is proportional to the amount, in frequency, by which the intermediate frequency which represents the sync tip exceeds the desired reference frequency.

At point "E," there will have been derived a negative voltage which, while the AFC is locked, will always be constant. The point "E" voltage is obtained by AM detection of the I.-F. output signal; therefore, it will be insensitive to the signal FM modulation. This voltage is derived through detection and limiting, in unit 176.

Essentially, then, this point "E" voltage is an "on" or "off" quantity—"on" when the incoming carrier is within the I.-F. band; "off" when it is not.

The loop operation may now be simply explained. The repeller supply is first set manually so that, with zero voltage going into the D.C. amplifier 173 the repeller voltage is that required to give the proper I.-F. frequency, Then, with the system in operation, the sync tip frequency will exceed the basic frequency by just that small amount necessary to produce a voltage at point "D" to buck out the voltage at point "E," and produce zero net voltage at the input of the D.C. amplifier 173. If the incoming signals applied to the discriminator 192 tend to increase in frequency because of drifting of the carrier frequency, for example, more voltage will appear at point "D." If the loop is properly (degeneratively) connected, the klystron frequency will be caused to increase, bringing the I.-F. frequency down to a point such that again the sync tip just barely exceeds the threshold. If the incoming signals applied to the discriminator tend to decrease in frequency, a reverse action takes place. By having large enough gain in the tuned 15 kc. amplifier, sync tip frequency may be maintained free of substantial error.

The effect of certain abnormal conditions may be noted:

(*a*) If the modulation is tuned off, and the carrier remains, the voltage at point "D" will disappear, the input to the D.C. amplifier 173 will go negative, and the klystron frequency will drop until the carrier is sitting on the upper slope of the I.-F. pass band. It will stay there stably until modulation reappears, at which time the proper lock-in point will be quickly re-established.

(*b*) If the signal goes off completely, noise only will appear at the output of the receiver. The maximum gain of the receiver should be kept to a low enough value so that both outputs "E" and "D" are close to zero, and hence to local oscillator frequency will be close to its correct value. It is found in practice possible to do this and still have ample receiver gain, provided a tuned A.C. amplifier is used.

The "hold-in" range of the AFC may be nearly equal to the width of the klystron repeller mode if the loop gain of the AFC is reasonably high.

The "pull-in" range of the AFC is simply the width of the I.-F. pass band plus the peak-to-peak modulation of the signal. Obviously, the AFC cannot lock on a signal of whose presence the I.-F. is not aware—so, with no modulation, the pull-in range is simply the I.-F. bandwidth. The presence of FM modulation effectively adds some "search" to the signal, adding directly to the pull-in range.

Some advantages of the method herein disclosed are:

(*a*) Special discriminator R.-F. circuitry is not necessary; the discriminator and limiter used are the ones conventionally required for the normal operation of this type of receiver. The economy of this is obvious, especially as there is little, if any, extra circuitry involved in the post-discriminator portion of this AFC.

(*b*) No special I.-F. alignment is necessary for the AFC.

(*c*) This system maintains frequency independent of picture modulation, and regardless of sizable misalignments in the I.-F. and discriminator circuitry, provided levels are adequate to cause complete limiting; if alignment is good, proper action is maintained down to extremely small signal levels.

Lines 150 and 151 leading to voltage monitoring and metering devices may be provided if desired, but are not essential. Line 151, if provided, may include detection circuitry 152 of conventional monitoring circuit design.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. An automatic frequency control system for a receiver of the type including an intermediate frequency amplifier and a local oscillator whose frequency is to be controlled by an impressed control voltage, which automatic frequency control system comprises a discriminator coupled to the output of said intermediate frequency amplifier, a clipper coupled to the output of said discriminator, a rectifier coupled to said clipper through tuned amplifying means, said rectifier having its output impressed upon a voltage summation device, means connected between said intermediate frequency amplifier and said summation device for deriving a direct voltage which is constant when the intermediate frequency remains within the band of said intermediate frequency amplifier, and means for deriving said control voltage from said summation device.

2. In a microwave receiver of the super heterodyne type employing an intermediate frequency amplifier and a klystron local oscillator having means responsive to an impressed control voltage for determining the klystron's frequency of oscillation, the improvement of an automatic frequency control circuit for controlling the frequency of oscillation of said klystron comprising a frequency discriminator coupled to the output of said intermediate frequency amplifier, a clipper coupled to the output of said discriminator, a tuned amplifier having its input coupled to said clipper, rectifying means coupled between the output of said tuned amplifier and a voltage summation network, a detector coupled to the output of said intermediate frequency amplifier, means connected between said summation network and said detector for limiting the voltage derived from said detector, and means connected to said summation network for deriving a control voltage.

References Cited in the file of this patent

UNITED STATES PATENTS

| | | |
|---|---|---|
| 2,138,747 | Robinson | Nov. 29, 1938 |
| 2,564,059 | Gensel | Aug. 14, 1951 |
| 2,659,813 | Schelleng | Nov. 17, 1953 |
| 2,676,256 | Schultz | Apr. 20, 1954 |
| 2,713,122 | Henley | July 12, 1955 |
| 2,817,755 | Koch | Dec. 24, 1957 |